(12) United States Patent
Chen et al.

(10) Patent No.: US 6,947,174 B1
(45) Date of Patent: Sep. 20, 2005

(54) SIMPLE MECHANISM FOR PROFILE SELECTION

(75) Inventors: Jindong Chen, Belmont, CA (US); John D. Halbur, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/569,959

(22) Filed: May 12, 2000

(51) Int. Cl.$^7$ ............................ B41B 1/00; G03F 3/08; H04N 1/46
(52) U.S. Cl. ..................... 358/1.9; 358/523; 358/501
(58) Field of Search .................. 358/1.9, 500, 523, 358/501, 1.15, 1.16; 382/166, 167, 165

(56) References Cited

U.S. PATENT DOCUMENTS

| | | | |
|---|---|---|---|
| 5,379,376 A | * | 1/1995 | Bednowitz ............... 345/501 |
| 6,226,011 B1 | * | 5/2001 | Sakuyama et al. ........ 345/600 |
| 6,253,243 B1 | * | 6/2001 | Spencer .................. 709/224 |
| 6,266,152 B1 | * | 7/2001 | Nakajima ................ 358/1.9 |
| 6,681,223 B1 | * | 1/2004 | Sundaresan ................ 707/6 |

FOREIGN PATENT DOCUMENTS

| | | | | |
|---|---|---|---|---|
| JP | 2002149587 A | * | 5/2002 | ......... G06F 13/14 |
| JP | 2004152109 A | * | 5/2004 | ......... G06F 3/12 |

* cited by examiner

Primary Examiner—Madeleine Nguyen
(74) Attorney, Agent, or Firm—Jeannette Walder

(57) ABSTRACT

In a system where the color space conversion process uses color profile look-up tables to select a profile for each of the possible attribute value combinations, assigning a value of wildcard to one or more attributes. In this case, if all of the values of one of the attributes can not be exactly matched, and that attribute has a wildcard value, the wildcard value is selected. The profile associated with the wildcard is designed to enable a reasonable color conversion in any case where an attribute calls for a particular value and the printer does not have a corresponding profile. The result is that the printer will most likely still print a reasonable image in the case where there is no matching profile.

9 Claims, 1 Drawing Sheet

```
        MediaName              MediaName
        MediaColor             MediaColor
        MediaWeight            MediaWeight
        MediaWhitePoint        MediaWhitePoint
        PressEmulation         PressEmulation
        ExitColorSpace         ExitColorSpace
        EntryColorSpace        EntryColorSpace
        RenderingIntent        RenderingIntent
        MediaReflection        MediaReflection
        MediaGlossiness        MediaGlossiness
        ViewingIlluminant      ViewingIlluminant
        ScreenType             ScreenType QUERY HANDLE q          PROFILE p for each attributeType a
        {
        if q.a == p.a || || p.a == wildcard
                found = found && TRUE;
        else
                found = FALSE;
        };
        return (found);
```

```
           MediaName                    MediaName
           MediaColor                   MediaColor
          MediaWeight                  MediaWeight
        MediaWhitePoint              MediaWhitePoint
         PressEmulation               PressEmulation
         ExitColorSpace               ExitColorSpace
        EntryColorSpace              EntryColorSpace
         RenderingIntent              RenderingIntent
         MediaReflection              MediaReflection
         MediaGlossiness              MediaGlossiness
        ViewingIlluminant            ViewingIlluminant
           ScreenType                   ScreenType QUERY HANDLE q                  PROFILE p for each attributeType a
      {
      if q.a == p.a || || p.a == wildcard
              found = found && TRUE;
      else
              found = FALSE;
      };
      return (found);
```

SIMPLE MECHANISM FOR PROFILE SELECTION

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY REFERENCE OF MATERIALS SUBMITTED ON A COMPACT DISK

Not applicable.

BACKGROUND OF THE INVENTION

A method of simplifying the selection of a color profile for the conversion of color coordinates from one color space to another, where there are a number of color management attributes, each having a number of values, by assigning a value of "wildcard" as one possible value to one or more attributes, thus making it possible to use one profile for a number of values of that attribute.

In the typical document generation process, a user at a terminal creates a document in page description language. One element of the document may be a color picture in some industry standard set of colors such as red, green and blue (RGB), and may also contain a list of one or more attributes such as paper type or halftone screen arrangement. These are sent to a particular printer for printing, and there, must be transformed into the color space that the target printer uses, such as cyan, magenta, yellow, black (CMYK). In addition, the resultant set of CMYK colors must be adjusted to fit the attributes of the particular printer, such as the media reflection type and glossiness of the paper and the color characteristics of the printer toner. All of these color processes are typically combined into a single table look-up which accommodates the color space conversion, and the attributes mandated by the user and printer.

More specifically, for each input pixel, the three input colors, such as RGB, are used to address a three dimensional (16 by 16 by 16, for a numerical example) cube of values (a profile), and interpolation is used for fractional distances between node values, to generate a three-color, CMYK, output pixel.

The problem is that for even a moderately complex printer, the number of combinations of attributes, and therefore, the number of profiles, becomes too large. For example, in a system which can print on four kinds of paper, can use paper with four different types of glossiness, using four different halftone patterns, and one of four types of lighting, 256 profiles would have to be stored.

Further, if an attribute value is called for and no profile exists for that value, the printer may not print. An alternative would be for the printer to select an available profile which may result in a poor quality image.

An improved method is needed for reducing the number of profiles required, or in the alternative, guaranteeing that a reasonable image will be printed in any case.

BRIEF SUMMARY OF THE INVENTION

This process selects an alternative wildcard color profile if an exact match is not available. Each profile is associated with a list of attributes that the color is built for. For certain attributes, the list of possible values was extended to include the value of a wildcard, which means that the wildcard profile covers values of the attribute that are not specifically listed. When the color management module fails to locate a profile with an exact match to all values of all attributes of a query, the system will find a profile whose values either match or have a value of wildcarding.

Not all attributes, such as entry and exit color space, may properly take wildcard as a possible value. The following are examples where it is proper:

Media type reflection—transparent/translucent/opaque/wildcard.

Media type glossiness—glossy/matte/bond paper/vellum/polyester film/special paper/wildcard.

Dither—noise ordered/ordered/error diffusion/cluster ordered/user defined/wildcard.

Rendering intent—saturation/relative colorimetric/absolute calorimetric/perceptual/wildcard.

Viewing illuminant—Daylight/tungsten/cool white fluorescent/user defined/wildcard.

The exact match is always preferred. However, in some cases the difference in print quality is small enough so that using the wildcard value instead of a particular value will not have a significant effect on quality. In this case a value of wildcard can be used for that attribute. For example, using the attributes listed above, let us assume that all of the values shown result in an excessive number of profiles. Then a value may be eliminated, reducing the number of possible profiles. For example, assume that the "vellum" value for paper, and its associated profiles, can be eliminated since the wildcard profile is highly similar to that of vellum. Now when the page description language asks for one of the vellum profiles, an exact match will not be found, and one of the wildcard profiles is used instead.

BRIEF DESCRIPTION OF THE DRAWING

FIG. 1 illustrates a process for profile selection.

DETAILED DESCRIPTION OF THE INVENTION

There is a certain degree of terminology confusion in the color management technology community. Terms Lookup table, LUT (originally acronym of look up table), CLUT (Color Look Up Table), TRC, etc. may mean different things to different people. For clarification, we therefore define here a set of terms that are to be used throughout this document.

Lookup table—One dimensional lookup table. Same as TRC.

LUT—Multi-dimensional lookup table with auxiliary input matrix, TRCs and output TRCs. Originally acronym of "Look Up Table", but its meaning has been drifting away.

TRC—Toner Reproduction Curve. One-dimensional lookup table. Also called lookup table, shaper.

The Color Profile Manager (CPM) is a system that is able to manage color related profile data and convert color data according to the profiles. The CPM has the capability of performing profile matching.

The input to CPM is a profile query from a CPM client, and an external database of color profile data. The query consists of various profile attribute values such as entry color space, exit color space, rendering intents, etc. The output from CPM is a profile data object that best matches these attribute values A profile data object may be a LUT (a multidimensional lookup table with auxiliary input and output TRC's and matrices), a calibration curve, a screening type, an ICC profile, or an appearance-modeling object.

A profile header consists of a certain set of attributes and mainly descriptive specifications. A header object in fact advertises what kind of job the profile data can do, convert from color space A to color space B, under viewing illuminant of C, on a media of type D and so on.

It is impractical and probably unnecessary to have different profiles for every single combination of attribute values. Hence a special value, Wildcard, is introduced into some of the attributes. A value of Wildcard means the profile is good for handling any value in the attribute.

The matching methods include a public method, mProfMatch, and a list of private methods such as m_equalColorSpace, m_equalRenderingHints, m_equalViewIllum, etc. Method mProfMatch uses the other methods to check if the attribute values in the profile header matches the query values. Note that an attribute value of Wildcard matches any possible value for that attribute. The return value of mProfMatch distinguishes between two kinds of matches, an exact matching without any wildcarding matching, or a matching with wildcarding matching. The CPM checks every profile in the database, prioritizes a profile with exact match over the others.

This interface is built around two handles, Job Handle and Query Handle.

A query handle is a handle for a query object. A query object stores a list of attribute values. A query is made by passing a query handle to a CPM Job session.

The following is a list of attributes that can be stored in a query object.

mEntryColorSpace /* input color space, CIE XYZ, CIE Lab */
mExitColorSpace /* output color space, Device CMYK, etc */
mRenderingIntent /* rendering intents */
mViewIllum /* viewing illuminant */
mMediaReflection /* media reflection */
mMediaGlossiness /* media glossiness */
mMediaWhitePoint /* media white point */
mScreenType /* halftoning screen type */
mMediaName /* media name string */
mMediaColor /* media color string */
mMediaWeight /* media weight */
mPressEmulation /* press emulation (such as SWOP)*/

A client sets the query content via interface calls, such as follows.

void CPMSetQueryHandleRenderingIntent (CPMQueryHandle, CPMRenderingIntent);
void CPMSetQueryHandleInputColorSpace (CPMQueryHandle, CPMColorSpace);

The following is an example of a CPM header, converting color data from CIE XYZ color space to device CMYK color space.

Below is an example of a header file that is attached to a profile. A LUT header file must begin with "#! Color Manager LUT Header File". A line begins with a "#" sign is a comment line. A comment line may appear in any place. In the following specification portion, {number} means a number. In [*] are the names of the attributes. The valid values of attributes are listed as follows under corresponding attributes. The value Wildcard exists in the attributes where it is appropriate. It means this header file advertises to handle color rendering, for any value in that specific attribute. An attribute should be followed by a valid value of its own (except of course comment lines can go in between them). The attribute is then bound to that value. We call it an attribute binding. The same attribute definition can show up more than once. The latter overwrites the former. This is a default header file for conversion between XYZB and Device CMYK:

! Color Manager LUT Header File
[Media Type Glossiness]
valid values are: Glossy/Matte/BondPaper/Vellum/PolyesterFilm/SpecialPaper/Wildcard
Wildcard
[Media Type Reflection]
valid values are: Transparent/Translucent/Opaque/Wildcard
Wildcard
[Dither]
valid values are
Noise Ordered Dither/Ordered Dither/Error Diffusion/Cluster Ordered Dither/User-defined Dither/Wildcard
Wildcard
[Viewing Illuminant]
valid values are
Daylight/Tungsten/Cool White Fluorescent/User-defined Viewing Illuminant/{x} {y}/Wildcard
Wildcard
[Input Space]
valid values are ACRGB/XEROXRGB/XYZ/LAB/Device RGB
XYZ
[Output Space]
valid values are Device CMYK
Device CMYK
[Rendering Intent]
valid values are
Saturation/Relative Colorimetric/Absolute Colorimetric/Perceptual/Wildcard
Wildcard
[Media Name]
valid values are: string or Wildcard
Wildcard
[Media Color]
valid values are strings that specify the color of media, e.g. Red or Wildcard
Wildcard
[Media Weight]
valid values are
float that specified the weight of medium in grams per square meter
or 0.0 for wildcarding
Wildcard
[Emulation]
valid values are: SWOPCoated/None
f not specified, NONE is used.
Wildcard
[Input Matrix]
valid values are
XYZ to ACRGB
or as shown bellow
{# of row} {# of line}
the matrix
3 3
1.649866 −0.412466 −0.215659
−0.852726 1.747905 0.089785
0.045161 −0.011290 1.173461

[LUT Filename]
file name followed by the size of the file. The file size can be
larger than the actual size
../lut/acrgb2cmyk.lut 66041

FIG. 1 is a diagram and pseudo-code describing the process.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A printing process responsive to a print job query including at least one printing attribute value, each printing attribute having two or more values associated with it, one of the values being a wildcard value, the printing process having the steps of converting input color pixels of an original color space into output color pixels of a different color space that is used by a printer, and printing the resultant pixels, the converting step comprising:
   providing a set of printing profiles for the printer, wherein each printing profile of the printer has a plurality of printing attribute values associated with it;
   identifying a printing profile from the set having the at least one printing attribute value in the print job query; and
   if the identified printing profile does not include the at least one printing attribute value in the print job query, selecting a printing profile from the set whose printing attribute values either match the at least one printing attribute values in the print query or have wildcard value, wherein a wildcard value means the printing profile is good for handling of any value in the printing attribute.

2. The method of claim 1 wherein the original color space comprises red, green and blue and the output color space comprises cyan, magenta and yellow.

3. The method of claim 1, wherein a printing attribute comprises one of media type, media type reflection, media type glossiness, dither; rendering intent, and viewing illuminant.

4. In a printing process responsive to at least two printing attributes, the process having the steps of converting input color pixels of an original color space into output color pixels of a different color space which is used by a printer, each printing attribute having a number of values, and printing the resultant pixels, the converting step comprising:
   determining at least first and second printing attributes, each of the first and second printing attributes having at least first and second values, the second value of the second attribute being a wildcard value, wherein a wildcard value means a printing profile is good for handling of any value in the second printing attribute,
   generating at least four printing profiles, one associated with each possible combination of printing attribute values of the at least first and second printing attributes, such that a first printing profile will have the first value of the first printing attribute and the first value of the second printing attribute, a second printing profile will have the first value of the first printing attribute and the second value of the second printing attribute, a third printing profile will have the second value of the first printing attribute and the first value of the second printing attribute and a fourth printing profile will have the second value of the first printing attribute and the second value of the second printing attribute, and
   using a printing profile having the second value of the second printing attribute for the converting step if one of two input printing attribute values matches one of the printing attribute values of the first printing attribute, and none of the input printing attribute values matches the first value of the second printing attribute.

5. The method of claim 4, wherein the original color space comprises red, green and blue and the output color space comprises cyan, magenta and yellow.

6. The method of claim 4, wherein a printing attribute comprises one of media type, media type reflection, media type glossiness, dither, rendering intent, and viewing illuminant.

7. A printing method responsive to first and second printing attributes, each of the first and second printing attributes having at least two values, comprising the steps of:
   assigning to the second value of the second printing attribute a value of wildcard, wherein a wildcard value means a printing profile is good for handling of any value in the second printing attribute,
   generating printing profiles for a plurality of combinations of first and second printing attribute values,
   one printing profile associated with each possible combination of printing attribute values of the first and second printing attributes,
   selecting a printing profile having the wildcard value for the second printing attribute for a color space conversion of input pixels to generate output pixels if one of two input printing attribute values matches one of the values of the first printing attribute, and none of the printing attribute values matches the first value of the second attribute, and
   printing the output pixels.

8. The method of claim 7, wherein the original color space comprises red, green and blue and the output color space comprises cyan, magenta and yellow.

9. The method of claim 7, wherein a printing attribute comprises one of media type, media type reflection, media type glossiness, dither, rendering intent, and viewing illuminant.

* * * * *